United States Patent
Kaneko et al.

(10) Patent No.: US 9,964,018 B2
(45) Date of Patent: May 8, 2018

(54) CONTROL DEVICE FOR INTERNAL COMBUSTION ENGINE AND CONTROL METHOD FOR INTERNAL COMBUSTION ENGINE

(71) Applicant: TOYOTA JIDOSHA KABUSHIKI KAISHA, Toyota-shi (JP)

(72) Inventors: Rihito Kaneko, Miyoshi (JP); Noboru Takagi, Toyota (JP); Isao Takagi, Okazaki (JP); Hidetoshi Onoda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 69 days.

(21) Appl. No.: 15/282,536

(22) Filed: Sep. 30, 2016

(65) Prior Publication Data

US 2017/0096929 A1    Apr. 6, 2017

(30) Foreign Application Priority Data

Oct. 1, 2015    (JP) .................................. 2015-196172

(51) Int. Cl.
*F01P 7/14*    (2006.01)
*F02D 17/04*    (2006.01)
(Continued)

(52) U.S. Cl.
CPC    *F01P 7/14* (2013.01); *F01P 3/20* (2013.01); *F01P 5/12* (2013.01); *F01P 11/16* (2013.01); *F02D 41/221* (2013.01); *F16K 31/042* (2013.01); *F01P 2007/146* (2013.01); *F01P 2031/32* (2013.01)

(58) Field of Classification Search
CPC ........... F02D 41/221; F02D 2009/0281; F02D 17/04; F01P 2007/146; F01P 11/14; F01P 2031/00; F01P 5/14; F01P 2037/00
See application file for complete search history.

(56) References Cited

U.S. PATENT DOCUMENTS 4,456,831 A * 6/1984 Kanegae ............... F02D 41/062
                                                             123/327
4,491,112 A * 1/1985 Kanegae ................. F02D 17/04
                                                             123/351

(Continued)

FOREIGN PATENT DOCUMENTS

| JP | 2008-012963 A | 1/2008 |
| JP | 2009-191853 A | 8/2009 |
| JP | 2014-201224 A | 10/2014 |

*Primary Examiner* — Long T Tran
(74) *Attorney, Agent, or Firm* — Oblon, McClelland, Maier & Neustadt, L.L.P.

(57) ABSTRACT

When both a position sensor and a motor malfunction, an ECU limits the engine rotation speed to such a speed range that the pressure inside a circulation route remains at or below a predetermined value even when the opening degree of a control valve is a minimum opening degree. When the position sensor is malfunction but the motor is not malfunction, the ECU relaxes the limits on the engine rotation speed, compared with when both the position sensor and the motor are malfunction, by driving the motor to an end of a motion range thereof and increasing the opening degree of the control valve to an opening degree larger than the minimum opening degree.

4 Claims, 8 Drawing Sheets

(51) Int. Cl.
  *F01P 3/20* (2006.01)
  *F01P 5/12* (2006.01)
  *F02D 41/22* (2006.01)
  *F01P 11/16* (2006.01)
  *F16K 31/04* (2006.01)

(56) References Cited

U.S. PATENT DOCUMENTS

| | | | | |
|---|---|---|---|---|
| 6,390,031 | B1* | 5/2002 | Suzuki | F01P 7/048 123/41.1 |
| 6,615,772 | B2* | 9/2003 | Ichinose | F01P 11/14 123/142.5 R |
| 6,679,202 | B2* | 1/2004 | Nakano | F01P 5/14 123/41.1 |
| 6,701,232 | B2* | 3/2004 | Yamaki | G01M 15/05 701/33.8 |
| 7,207,294 | B2* | 4/2007 | Stasio | A01K 15/026 119/707 |
| 9,297,294 | B2* | 3/2016 | Magnier-Cathenod | F01P 7/14 |
| 2003/0172882 | A1* | 9/2003 | Nakano | F01P 5/14 123/41.1 |
| 2016/0031291 | A1 | 2/2016 | Enomoto et al. | |

\* cited by examiner

CONTROL DEVICE FOR INTERNAL COMBUSTION ENGINE AND CONTROL METHOD FOR INTERNAL COMBUSTION ENGINE

INCORPORATION BY REFERENCE

The disclosure of Japanese Patent Application No. 2015-196172 filed on Oct. 1, 2015 including the specification, drawings and abstract is incorporated herein by reference in its entirety.

BACKGROUND

1. Technical Field

The present disclosure relates to a control device for an internal combustion engine and a control method for an internal combustion engine.

2. Description of Related Art

Japanese Patent Application Publication No. 2014-201224 discloses a cooling system that is provided, on a circulation route through which coolant circulates, with pumps and control valves. A valve body housed inside a housing of the control valve can be rotated by a motor to change the opening degree and the discharge destination of coolant. Such a cooling system is configured to control the flow rate of coolant in a coolant supply route and other routes by rotating the valve body by the motor while sensing the angle of the valve body relative to the housing with a sensor.

SUMMARY

When malfunction occurs in the sensor, the motor, etc. and then the opening degree of the control valve become difficult to control, the pressure of coolant inside the circulation route may be excessively high. For example, in the engine provided with the pump which is an engine-driven pump driven by the output shaft of the internal combustion engine, when malfunction occurs in the sensor or the motor while the opening degree of the control valve is small and then the control of the control valve becomes difficult, the amount of coolant that passes through the control valve may be limited. As a result, the pressure inside the circulation route may become excessively high when the rotation speed of the output shaft of the internal combustion engine becomes high and the amount of coolant discharged from the pump becomes large.

To prevent the pressure inside the circulation route from thus becoming excessively high, the rotation speed of the output shaft of the internal combustion engine may be limited and the rotation speed of the pump is reduced when malfunction occurs in the sensor or the motor.

However, when thus limiting the rotation speed of the output shaft of the internal combustion engine, limiting uniformly regardless of the aspects of malfunctions in the sensor and the motor would end up unnecessarily limiting the performance of the internal combustion engine.

The present disclosure provides a control device for an internal combustion engine and a control method for an internal combustion engine that prevent the performance of the internal combustion engine from being unnecessarily limited while preventing the pressure inside the circulation route from becoming excessively high in the event of malfunction in the control valve.

A first aspect of the present disclosure provides a control device for an internal combustion engine. The internal combustion engine includes an output shaft and a cooling system. The cooling system includes a circulation route through which coolant circulates, a pump and a control valve. The pump and the control valve are disposed on the circulation route. The pump is configured to be driven by the output shaft. The control valve includes a housing, a valve body housed in the housing, and an opening degree detector. The valve body is configured to be rotated by a motor to adjust the opening degree. The opening degree detector is configured to detect the opening degree of the valve body. The control device includes an electric control unit. The electronic control unit is configured to control the motor, control a rotation speed of the output shaft, detect malfunction in the motor, and detect malfunction in the opening degree detector. The electronic control unit is configured to, when both malfunction in the opening degree detector and malfunction in the motor are detected by the electronic control unit, limit the rotation speed of the output shaft to a speed range in which a pressure inside the circulation route remains equal to or lower than a predetermined value and the opening degree of the valve body is a minimum opening degree. The electronic control unit is configured to, when the malfunction in the opening degree detector is detected and no malfunction in the motor is detected by the electronic control unit, relax the limits on the rotation speed of the output shaft, compared with the limits when both the malfunction in the opening degree detector and the malfunction in the motor are detected by the electronic control unit, and drive the motor to an end of a motion range of the motor and fix the opening degree of the valve body at a stopper opening degree, the stopper opening degree being larger than the minimum opening degree.

The predetermined value may be a value specifically set for each internal combustion engine, and, for example, may be set to be smaller than a pressure at which a hose constituting a part of the circulation route corner off under the pressure of coolant. How smaller the predetermined value is set appropriately and specifically for each internal combustion engine.

According to this configuration, the rotation speed of the output shaft is limited when malfunction occurs in both the opening degree detection unit and the motor and the opening degree of the valve body is neither sensed nor controlled. As a result, the rotation speed of the pump is reduced and the amount of coolant discharged is reduced, so that a pressure rise inside the circulation route is prevented. On the other hand, when malfunction occurs in the opening degree detection unit but no malfunction occurs in the motor, i.e., when the opening, degree of the valve body cannot be sensed but the control valve can be driven, the motor is driven to the end of the motion range and the opening degree of the valve body is fixed at the stopper opening degree. In this case, since the stopper opening degree is larger than the minimum opening degree, it is possible to present the performance of the internal combustion engine from being unnecessarily limited while preventing the pressure inside the circulation route from becoming excessively high by relaxing the limits on the rotation speed of the output shaft compared with when malfunction occurs in both the opening degree detection unit and the motor.

In the control device, the electronic control unit may be configured to, when the malfunction in the motor is detected but no malfunction in the opening degree detector is detected by the electronic control unit, limit the rotation speed of the output shaft to the speed range in which the pressure inside the circulation route remains equal to or lower than the predetermined value when the opening degree of the valve body is an opening degree detected by the opening degree detector.

According to this configuration, when no malfunction occurs in the opening degree detection unit but malfunction occurs in the motor, the rotation speed of the output, shaft is limited to a speed range according to an opening degree detected by the opening degree detection unit. Therefore, when the opening degree of the valve body detected by the opening degree detection unit is larger than the minimum opening degree, the limits on the rotation speed of the output shaft are relaxed compared with when malfunction occurs in both the opening degree detection unit and the motor. Thus, compared with when the configuration is adopted in which the rotation speed of the output shaft is uniformly limited in the event of malfunction in the control valve, it is possible to present the performance of the internal combustion engine from being unnecessarily limited while preventing the pressure inside the circulation route from becoming excessively high.

In the control device, the stopper opening degree may be set to be a maximum value of the opening degree of the valve body. According to the above configuration, the stopper opening degree is set to be the maximum value of the opening degree of the valve body. Thus, the opening degree of the valve body is fixed at the maximum value when malfunction in the opening degree detection unit is detected but no malfunction in the motor is detected. As a result, the control valve assumes a state in which coolant can most easily pass therethrough, and the limits on the rotation speed of the output shaft of the internal combustion engine can be minimized.

A second aspect of the present disclosure provides a control method for an internal combustion engine, the internal combustion engine including an output shaft and a cooling system. The cooling system includes a circulation route through which coolant circulates, a pump, and a control valve, the pump and the control valve being disposed on the circulation route. The pump is configured to be driven by the output shaft. The control valve includes a housing, a valve body housed in the housing, and an opening degree detector. The valve body is configured to be rotated by a motor to adjust the opening degree. The opening degree detector is configured to detect the opening degree of the valve body. The control method includes: when both malfunction in the opening degree detector and malfunction in the motor are detected, limiting a rotation speed of the output shaft to a speed range in which a pressure inside the circulation route remains equal to or lower than a predetermined value and the opening degree of the valve body is a minimum opening degree; and when malfunction in the opening degree detector is detected and no malfunction in the motor is detected, relaxing the limits on the rotation speed of the output shaft, compared with the limits when both the malfunction in the opening degree detector and the malfunction in the motor are detected, and driving the motor to an end of a motion range of the motor and fixing the opening degree of the valve body at a stopper opening degree, the stopper opening degree being larger than the minimum opening degree.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

In the following, one embodiment of an internal combustion engine control deuce will be described with reference to FIG. 1 to FIG. 12. First, the configuration of an internal combustion engine 1 that is an object to be controlled by the control device will be described with reference to FIG. 1. The internal combustion engine 1 is an internal combustion engine to be loaded on a vehicle.

Figure 1:
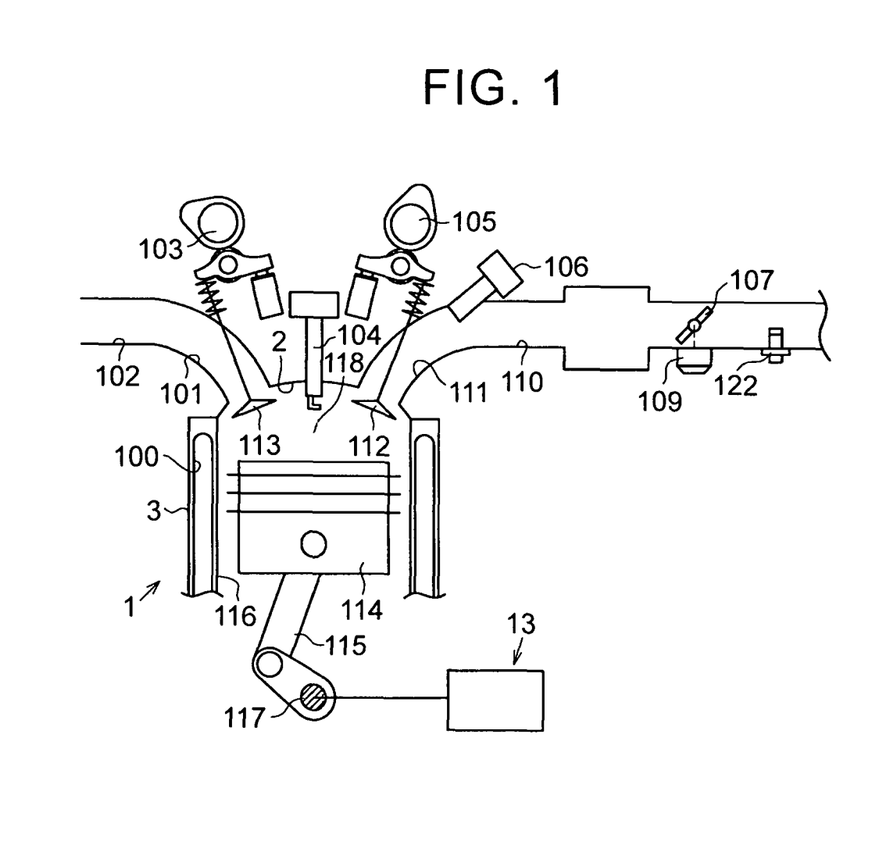
FIG. 1 is a diagram schematically showing the configuration of an internal combustion engine that is an object to be controlled by an ECU according to an embodiment.

As shown in FIG. 1, a piston 114 is housed in a cylinder 116. The cylinder 116 is disposed in a cylinder block 3 of the internal combustion engine 1. The internal combustion engine 1 is a multi-cylinder internal combustion engine with a plurality of cylinders 116, and one of the plurality of cylinders 116 is shown in FIG. 1.

The piston 114 is coupled through a connecting rod 115 to a crankshaft 117 that is the output shaft of the internal combustion engine 1. In the cylinder block 3, a water jacket 100 through which engine coolant circulates is formed so as to surround each cylinder 116.

A cylinder head 2 is installed on top of the cylinder block 3, and a combustion chamber 118 is formed by an inner peripheral surface of the cylinder 116, a top surface of the piston 114, and the cylinder head 2.

A spark plug 104 is provided so as to face the piston 114 in an upper part of each combustion chamber 118 in the cylinder head 2. The cylinder head 2 has an intake port 111 and an exhaust port 101 communicating with each combustion chamber 118. The intake port 111 is provided with an injector 106 that injects fuel toward the combustion chamber 118.

The intake port 111 is connected to an intake manifold and forms a part of an intake passage 110. The exhaust port 101 is connected to an exhaust manifold and forms a part of an exhaust passage 102.

As shown in FIG. 1, the intake passage 110 is provided with a throttle valve 107 that is driven by a throttle valve motor 109. The throttle valve 107 is configured to regulate an intake air amount that is the amount of air introduced into each combustion chamber 118.

As shown in FIG. 1, the cylinder head 2 is provided with an intake valve 112 that provides and blocks communication between the intake passage 110 and the combustion chamber 118. The cylinder head 2 is provided with an exhaust valve 113 that provides and blocks communication between the exhaust passage 102 and the combustion chamber 118. The intake valve 112 and the exhaust valve 113 are each urged in a valve closing direction by the urging force of a valve spring. Inside the cylinder head 2, an intake camshaft 105 driving the intake valve 112 and an exhaust camshaft 103 driving the exhaust valve 113 are rotatably supported.

The exhaust camshaft 103 and the intake camshaft 105 are coupled to the crankshaft 117 through a timing chain. When the crankshaft 117 makes two rotations, the exhaust camshaft 103 and the intake camshaft 105 each make one rotation accordingly. Thus, when the crankshaft 117 rotates as the engine is operated, the intake camshaft 105 and the exhaust camshaft 103 rotate. Then, the intake valve 112 is lifted in a valve opening direction by the action of a cam nose formed on the intake camshaft 105. Meanwhile, the exhaust valve 113 is lifted in a valve opening direction by the action of a cam nose disposed on the exhaust camshaft 103.

A coolant pump 13 that circulates coolant through a cooling system of the internal combustion engine 1 is connected to the crankshaft 117. Since the coolant pump 13 is driven by the crankshaft 117, the amount of coolant discharged from the coolant pump 13 increases as the rotation speed of the crankshaft 117 increases.

Figure 2:
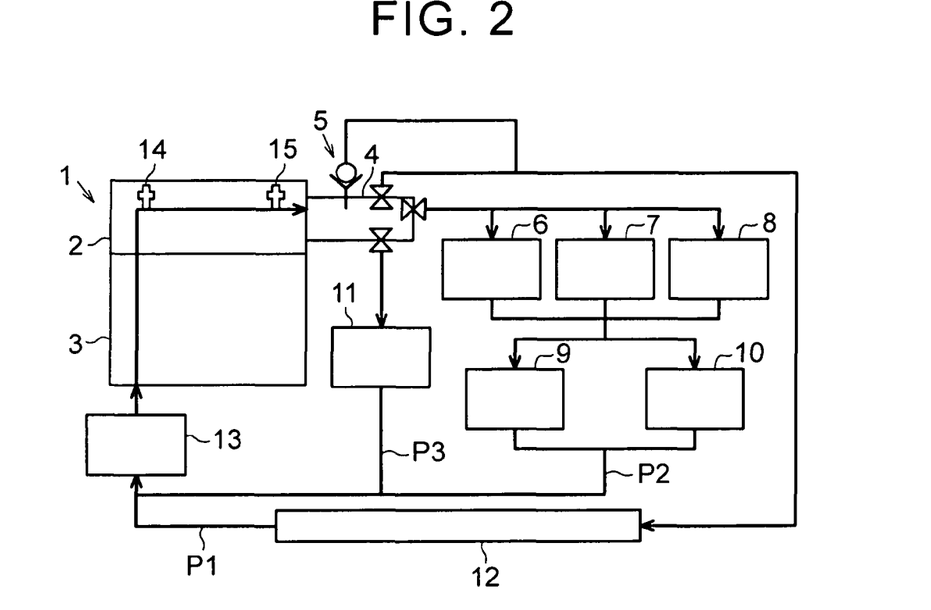
FIG. 2 is a diagram schematically showing the configuration of a cooling system of the internal combustion engine.

Next, the cooling system of the internal combustion engine 1 will be described with reference to FIG. 2. As shown in FIG. 2, the cooling system of the internal combustion engine 1 includes a multiway valve 4 as a control valve that switches the circulation route of coolant and controls the amount of coolant circulated.

The coolant having been discharged from the coolant pump 13 is supplied to the multiway valve through the inside of the cylinder block 3 and the cylinder head 2. Inside the cylinder head 2, a head coolant temperature sensor 14 that detects the temperature of coolant immediately after flowing from the cylinder block 3 into the cylinder head 2, and an outlet coolant temperature sensor 15 that detects the temperature of coolant passing through the cylinder head 2 and discharged to the multiway valve 4 are provided.

The multiway valve 4 has three discharge destinations of coolant. A first discharge destination of coolant is a first coolant passage P1 that passes through a radiator 12. The part of the first coolant passage P1 on the downstream side from the radiator 12 is connected to the coolant pump 13, and the coolant having passed through the radiator 12 is returned to the coolant pump 13.

A second discharge destination of coolant is a second coolant passage P2 through which coolant is circulated to devices, such as a throttle body 6 and an EGR valve 7, provided in various parts of the interned combustion engine 1. The second coolant passage P2 is first branched into three branch passages to supply coolant to the throttle body 6, the EGR valve and an EGR cooler 8. After the three branch passages are temporarily merged together on the downstream side from the throttle body 6 the EGR valve 7, and the EGR cooler 8, the second coolant passage P2 is branched into two branch passages to supply coolant to an oil cooler 9 and an automatic transmission fluid warming-up unit 10. The two branch passages are merged together on the downstream side from the oil cooler 9 and the automatic transmission fluid warming-up unit 10, and then the second coolant passage P2 is merged with the part of the first coolant passage P1 on the downstream side from the radiator 12.

A third discharge destination of coolant is a third coolant passage P3 through which coolant is circulated to a heater core 11 in an air conditioner. The part of the third coolant passage P3 on the downstream side from the heater core 11 is merged with the part of the second coolant passage P2 that is on the downstream side from the merging point of the two branch passages on the downstream side from the oil cooler 9 and the automatic transmission fluid warming-up unit 10 and that is on the upstream side from the merging point of the first coolant passage P1 and the second coolant passage P2.

Thus, the coolant passages P1, P2, P3 are merged together and connected to the coolant pump 13. Therefore, the coolant having flowed through the coolant passages P1, P2, P3 is returned to the coolant pump 13. Then, the coolant having been returned to the coolant pump 13 is sent into the internal combustion engine 1 again by the coolant pump 13.

The multiway valve 4 is provided with a relief valve 5 that is opened to relieve the pressure of coolant when the pressure inside the multiway valve 4 becomes excessively high. Next, the structure of the multiway valve 4 will be described with reference to FIG. 3 to FIG. 6.

Figure 3:
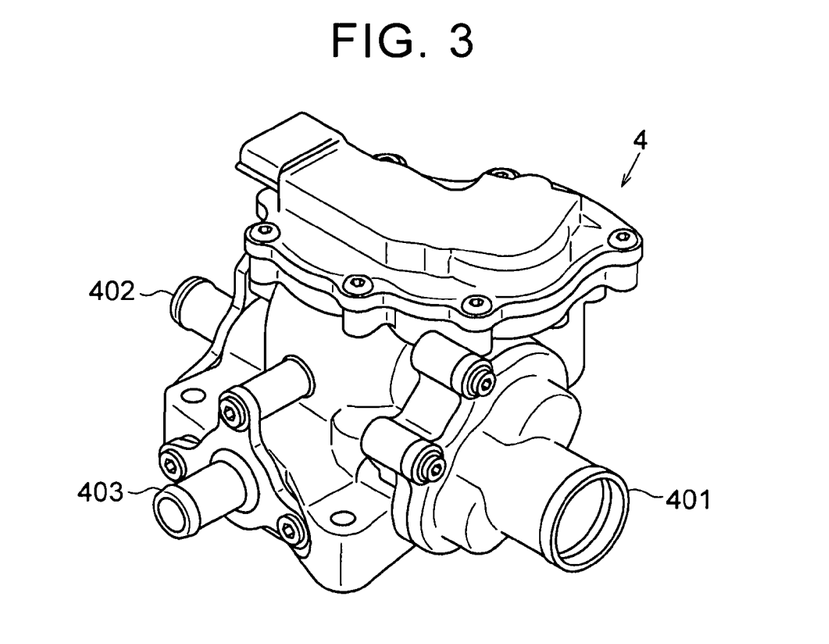
FIG. 3 is a perspective view of a multiway valve that is controlled by the ECU according to the embodiment.

As shown in FIG. 3, the multiway valve 4 is provided with three ports 401, 402, 403, serving as outlets, in different directions from one another. The heater port 402 and the device port 403 have substantially the same inner diameter, while the inner diameter of the radiator port 401 is larger than the inner diameters of the heater port 402 and the device port 403. The first coolant passage P1 is connected to the radiator port 401, and the third coolant passage P3 is connected to the heater port 402. The second coolant passage P2 is connected to the device port 403.

Figure 4:
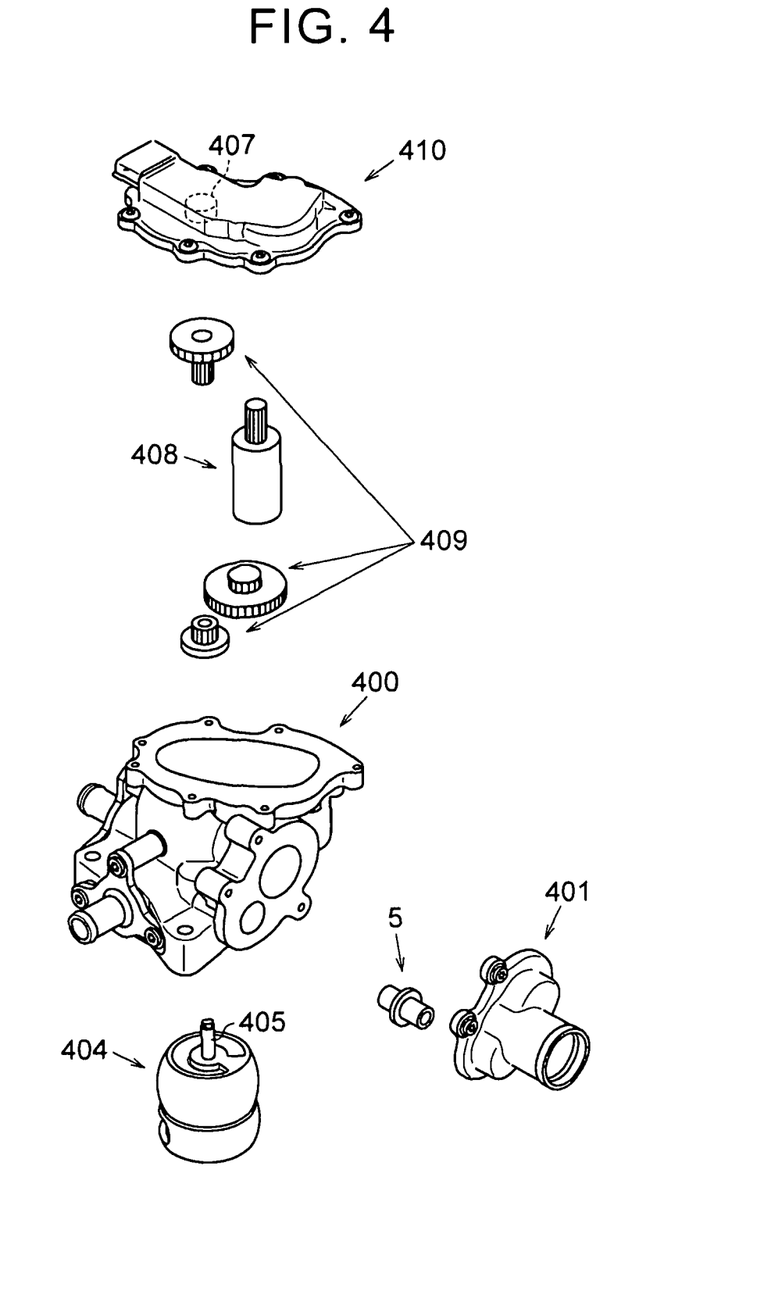
FIG. 4 is an exploded perspective view of the multiway valve.

FIG. 4 shows some of the components of the multiway valve 4. A housing 400 forms the framework of the multiway valve 4 and has holes leading to the ports 401, 402, 403. There are two holes leading to the radiator port 401, with the relief valve 5 housed in one of the holes. The radiator port 401 is mounted on the housing 400 with the relief valve 5 thus housed in one of the holes. Thus, the relief valve 5 is provided inside the radiator port 401. The relief valve 5 is provided in the radiator port 401 of the three ports 401, 402, 403, because the passage sectional area of the radiator port 401 is larger than the passage sectional areas of the heater port 402 and the device port 403 and therefore the amount of pressure relieved can be easily secured.

A valve body 404 is housed inside the housing 400. The valve body 404 has a coolant passage inside. When the valve body 404 rotates around a shaft 405, the angle of the valve body 404 relative to the housing 400 varies. Accordingly, the extent of overlap between the holes of the housing 400 leading to the ports 401, 402, 403 and the coolant passage inside the valve body 404 varies. As a result, the flow rate of coolant flowing through the ports 401, 402, 403 varies.

A motor 408 and gears 409 are housed in the housing 400. The shaft 405 of the valve body 404 is connected to the motor 408 through the gears 409. The rotation speed of the motor 408 is changed by the gears 409, and the valve body 404 rotates at the changed rotation speed. One reason why the speed is changed through the gears 409 is that the rotation speed of the motor 408 is high and the valve body 404 would rotate too fast at that rotation speed. Another reason is that a large torque is required to rotate the valve body 404 filled with coolant. Therefore, the gears 409 transmit the rotation of the motor 408 to the valve body 404 after reducing the rotation speed.

A sensor cover 410 is mounted on the housing 400 so as to cover the part where the motor 408 and the gears 409 are housed. A position sensor 407 is mounted inside the sensor cover 410. The leading end of the shaft 405 of the valve body 404 is fitted on a rotor of the portion sensor 407. The position sensor 407 is a sensor that outputs a voltage proportional to the rotation angle of the rotor. Thus, when the valve body 404 rotates inside the housing 400, the rotor of the position sensor 407 rotates accordingly, so that a voltage according to the angle of the valve body 404 relative to the housing 400 is output from the position sensor 407.

Figure 5A:
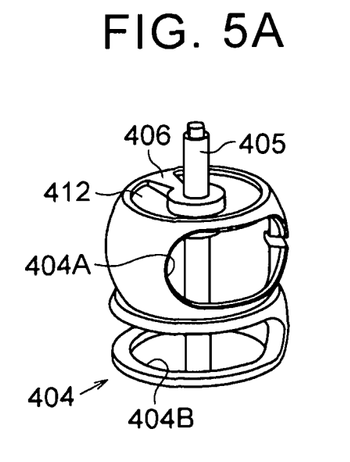
FIG. 5A is a perspective view of a valve body that is a component of the multiway valve.
Figure 5B:
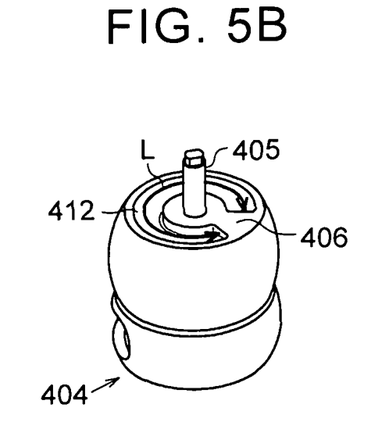
FIG. 5B is a perspective view of the valve body that is a component of the multiway valve.

FIG. 5A and FIG. 5B are enlarged views of the valve body 404 of FIG. 4. The valve body 404 has the shape of two barrel-shaped objects placed one on top of the other, with the shaft 405 provided at the center.

As shown in FIG. 5A, the valve body 404 has holes 404A, 404B, through which coolant can pass, bored in side surfaces of the two barrels. That is, the holes 404A, 404B form a part of the coolant passage provided inside the valve body 404. The hole 404A communicates with the radiator port 401 when the valve body 404 is within a certain range of angle relative to the housing 400. On the other hand, the hole 404B is positioned so as to communicate with at least one of the heater port 402 and the device port 403 when the valve body 404 is within another range of angle relative to the housing 400.

As shown in FIG. 5A and FIG. 5B, a groove 412 is formed in an upper surface of the valve body 404 so as to extend around the root of the shaft 405 while leaving a part of the upper surface as a stopper 406.

Figure 6:
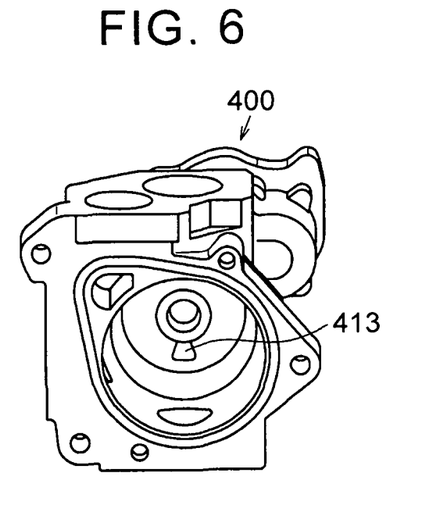
FIG. 6 is a perspective view of a housing that is a component of the multiway valve.

FIG. 6 is a perspective view of the housing 400 as seen from an insert direction of the valve body 404. A stopper 413 is provided in the housing 400 so as to be housed inside the groove 412 when the valve body 404 is housed inside the housing 400. When the valve body 404 is housed inside the housing 400, the stoppers 406, 413 come into contact with each other, which limits the rotation of the valve body 404 relative to the housing 400. That is, the valve body 404 can rotate relative to the housing 400 within the range indicated by the arrow L in FIG. 5B within which the stopper 413 moves.

Such a multiway valve 4 is fixed to the cylinder head 2 such that the part of a housing hole shown in FIG. 6 into which the valve body 404 is inserted overlaps a coolant outlet of the cylinder head 2 of the internal combustion engine. Thus, coolant flows into the multiway valve 4 through the opening of the housing hole.

Figure 7:
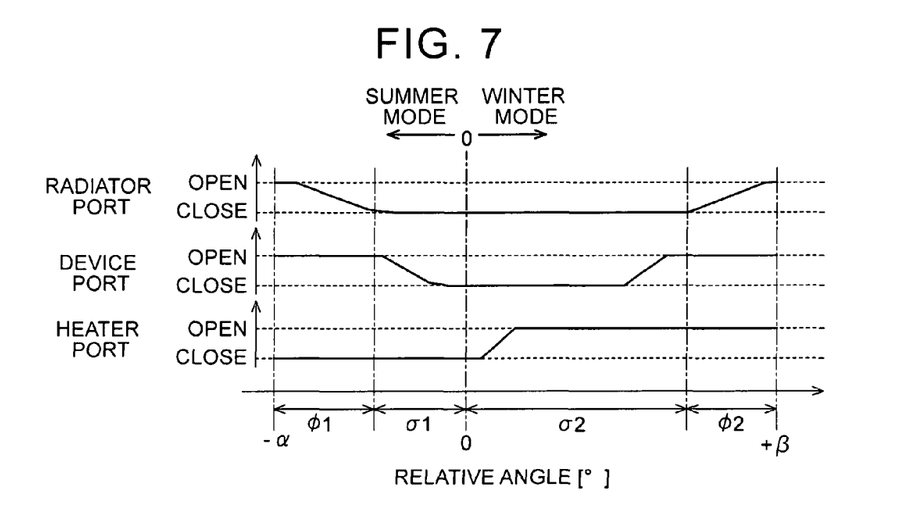
FIG. 7 is a graph showing relations between the angle of the valve body relative to the housing of the multiway valve and the opening degrees of ports.

FIG. 7 is a graph showing relations between the angle of the valve body 404 relative to the housing 400 of the multiway valve 4 and the opening degrees of the ports 401, 402, 403. As shown in FIG. 7, in the multiway valve 4, with the position at which all the ports 401, 402, 403 are closed taken as the position of the relative angle 0°, the valve body 404 can be rotated in the plus direction and the minus direction until the stopper 413 provided in the housing 400 and the stopper 406 provided in the valve body 404 come into contact with each other. That is, in the multiway valve 4, a fully-closed state in which the ports 401, 402, 403 are closed, i.e., the state of the opening degree 0, corresponds to the minimum opening degree.

The sizes and positions of the holes 404A, 404B provided in the valve body 404 are set such that the opening degrees of the ports 401, 402, 403 vary as the angle of the valve body 404 relative to the housing 400 varies as shown in FIG. 7.

That is, in the multiway valve 4, when the valve body 404 is rotated in the plus direction from the position of the relative angle 0°, the heater port 402 first starts to open, and the opening degree of the heater port 402 increases gradually as the relative angle increases. Then, if the relative angle further increases after the heater port 402 is fully opened, the device port 403 next opens. The opening degree of the device port 403 increases as the relative angle increases, and after the device port 403 is fully opened, the radiator port 401 starts to open. The opening degree of the radiator port 401 also increases as the relative angle increases, and the radiator port 401 is fully opened shortly before the position of the relative angle +β° at which the stopper 406 and the stopper 413 come into contact with each other is reached. Then, the ports 401, 402, 403 are kept fully opened until the position of the relative angle +β° is reached. Thus, in the multiway valve 4, the end of the motion range in the plus direction of the valve body 404 and the motor 408 corresponds to the position of the relative angle +β°, and the opening degree of the valve body 404 at that position is the stopper opening degree in the plus direction. In short, the stopper opening degree in the plus direction is the opening degree in the state in which all the ports 401, 402, 403 are fully opened, and corresponds to the maximum value of the opening degree of the valve body 404.

On the other hand, in the multiway valve 4, when the valve body 404 is rotated in the minus direction from the position of the relative angle 0°, the heater port 402 does not open. In this case, the device port 403 first starts to open, and the opening degree of the device port 403 increases gradually as the relative angle increases. If the relative angle further increases after the device port 403 is fully opened, the radiator port 405 opens. In the case of rotating the valve body 404 in the minus direction, that the absolute value of the relative angle increases is expressed as that the relative angle increases. The opening degree of the radiator port 401 also increases as the relative angle increases, and the radiator port 401 is fully opened shortly before the position of −α° at which the stopper 406 and the stopper 413 come into contact with each other is reached. Then, the radiator port 401 and the device port 403 are kept fully opened until the position of −α° is reached. Thus, in the multiway valve 4, the end of the motion range in the minus direction of the valve body 404 and the motor 408 corresponds to the position of the relative angle −α°, and the opening degree of the valve body 404 at that position is the stopper opening degree in the minus direction. In short, the stopper opening degree in the minus direction is the opening degree in the state in which the radiator port 401 and the device port 403 are fully opened.

Figure 8:
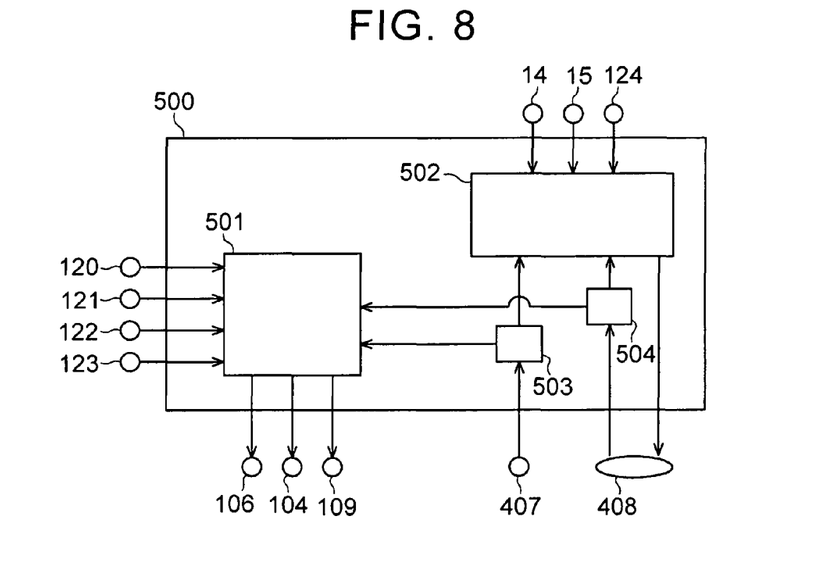
FIG. 8 is a block diagram showing input-output relations between the ECU and constituents according to the embodiment.

Thus, the multiway valve 4 is configured such that, in whichever direction the valve body 404 is rotated, the opening degree of the valve body 404 increases as the relative angle increases. Next, an electronic control unit (ECU) 500 will be described with reference to FIG. 8. FIG. 8 is a block diagram showing input-output relations between the ECU 500 and constituents.

The ECU 500 includes a rotation speed control unit 501 that controls the engine rotation speed being the rotation speed of the crankshaft 117. A vehicle speed sensor 120 that detects the vehicle speed, an accelerator position sensor 121 that detects the opening degree of the accelerator, an air flowmeter 122 that detects the amount of air flowing through the intake passage 110, a crank position sensor 123 that detects the engine rotation speed, and the like are connected to the rotation speed control unit 501. On the basis of signals input from the sensors 120 to 123 etc., the rotation speed control unit 501 normally controls the engine rotation speed by controlling the injector 106, the spark plug 104, and the throttle valve motor 109 such that a required torque can be obtained.

The ECU 500 further includes a motor control unit 502 that controls the opening degree of the valve body 404 by controlling the motor 408 of the multiway valve 4. The head coolant temperature sensor 14, the outlet coolant temperature sensor 15, the position sensor 407, and an outside air temperature sensor 124 are connected to the motor control unit 502. The motor control unit 502 senses the opening degree of the valve body 404 according to the amount of voltage output from the position sensor 407. That is, the position sensor 407 in this embodiment is one example of the opening degree detector that detects the opening degree of the valve body 404. Normally, the motor control unit 502 thus controls the opening degree of the valve body 404 in the multiway valve 4 by controlling the motor 408 while sensing the opening degree of the valve body 404, and thereby switches the circulation route of coolant in the cooling system of the internal combustion engine 1 and controls the amount of coolant circulated.

The ECU 500 is further provided with a motor malfunction detection unit 504 that detects malfunctions in the motor 408 and an opening degree malfunction detection unit 503 that detects malfunctions in the position sensor 407. The opening degree malfunction detection unit 503 detects whether or not there is disconnection, short-circuit, or the like in a circuit that supplies electric power to the position sensor 407.

The motor malfunction detection unit 504 detects whether or not there is disconnection, short-circuit, or the like in a circuit supplying electric power to the motor 408. The ECU 500 detects through the motor malfunction detection unit 504 and the opening degree malfunction detection unit 503 whether or not there is malfunction in the multiway valve 4 while controlling the engine rotation speed by the rotation speed control unit 501, and switches the control mode of the internal combustion engine 1 according to the detection results.

Figure 9:
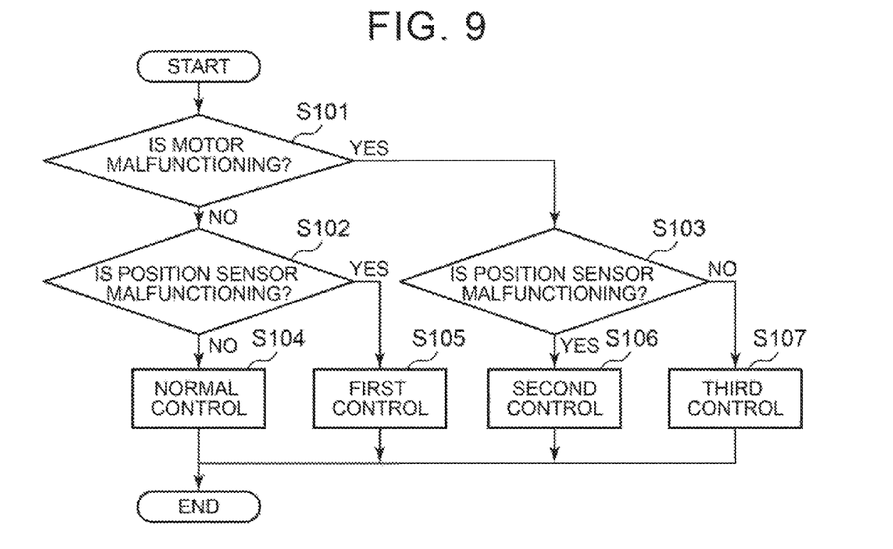
FIG. 9 is a flowchart showing the flow of a process executed by the ECU according to the embodiment to switch the control mode.

FIG. 9 is a flowchart showing the flow of a process executed by the ECU 500 to switch the control mode. This sequence of process steps is repeatedly executed while electric power is supplied to the ECU 500.

As shown in FIG. 9, when this sequence of process steps is started, first, in step S101, the ECU 500 determines whether or not the motor 408 is malfunction. In step S101, the ECU 500 determines that the motor 408 is malfunction if a motor malfunction flag that is set through the process shown in FIG. 10 is on, and determines that the motor 408 is not malfunction if the motor malfunction flag is off.

Figure 10:
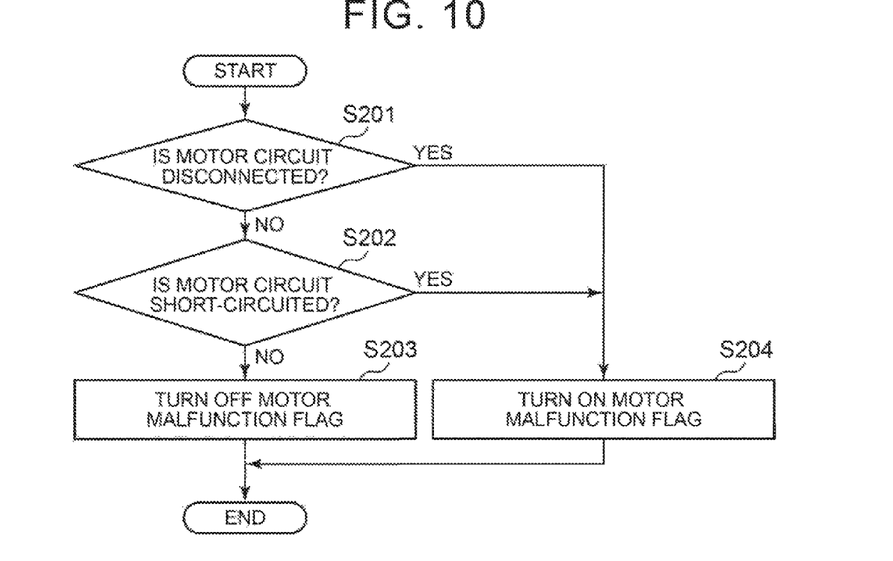
FIG. 10 is a flowchart showing the flow of a process executed by the ECU according to the embodiment to detect malfunctions in the motor.

The sequence of process steps shown in FIG. 10 is repeatedly executed while electric power is supplied to the ECU 500. As shown in FIG. 10, when this process is started, first, in step S201, the ECU 500 determines whether or not there is disconnection in the circuit including the motor 408. Specifically, since no current flows through the motor 408 if there is disconnection, the ECU 500 determines that there is disconnection if no current is flowing through the motor 408 by checking the value of the current flowing through the motor 408.

When it is determined in step S201 that there is no disconnection in the circuit including the motor 408 (S201: NO), the ECU 500 next determines in step S202 whether or not there is short-circuit in the circuit including the motor 408. Specifically, since a larger current than normal flows through the motor 408 if there is short-circuit, the ECU 500 determines that there is short-circuit if the valve of the current flowing through the motor 408 is larger than that of a current that normally flows through the motor 408 when the motor 408 is driven.

When it is determined in step S202 that there is no short-circuit in the circuit including the motor 408 (S202: NO), the ECU 500 turns off the motor malfunction flag in step S203 and temporarily ends the current process.

On the other hand, when it is determined in step S201 that there is disconnection in the circuit including the motor 408 (S201: YES), or it is determined in step S202 that there is short-circuit in the circuit including the motor 408 (S202: YES), the ECU 500 turns on the motor malfunction flag in step S204 and temporarily ends the current process.

Figure 11:
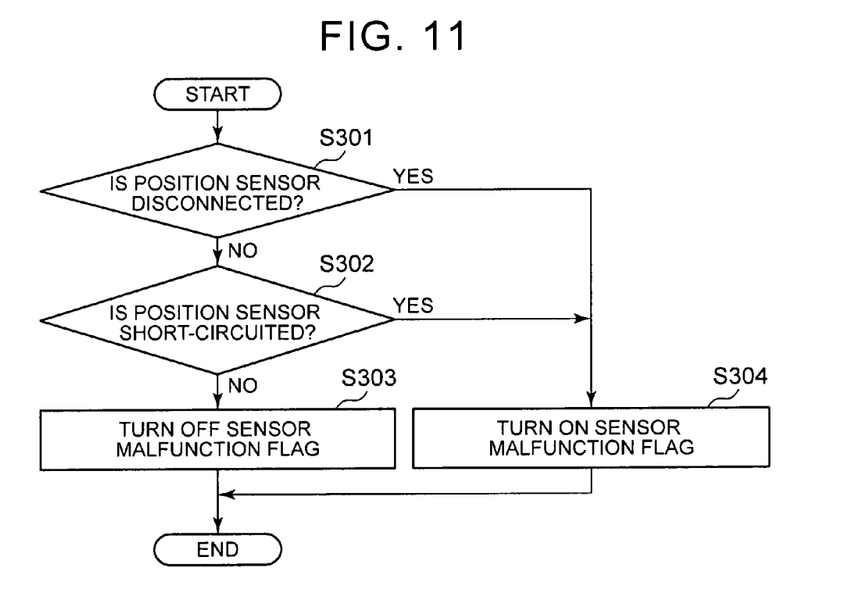
FIG. 11 is a flowchart showing the flow of a process executed by the ECU according to the embodiment to detect malfunctions in a position sensor.

As shown in FIG. 9, when it is determined in step S101 that the motor 408 is not abnormal (S101: NO), the ECU 500 proceeds with the process to step S102. In step S102, the ECU 500 determines whether or not the position sensor 407 is malfunction. In step S102, the ECU 500 determines that the position sensor 407 is malfunction if the sensor malfunction flag that is set through the process shown in FIG. 11 is on. The ECU 500 determines that the position sensor 407 is not malfunction if the sensor malfunction flag is off.

The sequence of process steps shown in FIG. 11 is repeatedly executed by the ECU 500 while electric power is supplied to the ECU 500. As shown in FIG. 11, when this process is started, first, in step S301, the ECU 500 determines whether or not there is disconnection in the circuit including the position sensor 407. Specifically, since no current flows through the position sensor 407 if there is disconnection, the ECU 500 determines that there is disconnection if no current is flowing through the position sensor 407 by checking the value of the current flowing through the position sensor 407.

When it is determined in step S501 that there is no disconnection in the circuit including the position sensor 407 (S301: NO), next, in step S302, the ECU 500 determines whether or not there is short-circuit in the circuit including the position sensor 407. Specifically, since a larger current than normal flows through the position sensor 407 if there is short-circuit, the ECU 500 determines that there is short-circuit if the value of the current flowing through the position sensor 407 is larger than that of a current that flows through the position sensor 407 when there is no short-circuit in the position sensor 407.

When it is determined in step S302 that there is no short-circuit in the circuit including the position sensor 407 (S302: NO), the ECU 500 turns off the sensor malfunction flag in step S303 and temporarily ends the current process.

On the other hand, when it is determined in step S301 that there is disconnection in the circuit including the position sensor 407 (S301: YES), or it is determined in step S302 that there is short-circuit in the circuit including the position sensor 407 (S302: YES), the ECU 500 turns an the sensor malfunction flag in step S304 and temporarily ends the current process.

As shown in FIG. 9, when it is determined in step S102 that the position sensor 407 is not malfunction (S102: NO), the ECU 500 proceeds with the process to step S104.

In this case, since neither malfunction in the position sensor 407 nor malfunction in the motor 408 is detected, the ECU 500 performs normal control in step S104. In the normal control of step S104, the ECU 500 as at normal times controls the engine rotation speed such that a required torque can be obtained, and controls the opening degree of the valve body 404 in the multiway valve 4 by controlling the motor 408 while sensing the opening degree of the valve body 404.

Specifically, in the normal control, the ECU 500 switches between a summer mode and a winter mode according to the outside air temperature detected by the outside air temperature sensor 124. When the outside air temperature is equal to or lower than a reference temperature and the heater of the air conditioner is likely to be used, the ECU 500 controls the motor 408 in the winter mode. In the winter mode, the motor 408 is controlled within the positive range of the relative angle. On the other hand, when the outside air temperature is higher than the reference temperature, the ECU 500 controls the motor 408 in the summer mode. In the summer mode, the motor 408 is controlled within the negative range of the relative angle.

As described with reference to FIG. 7, when the relative angle is within the positive range, the heater port 402 first opens as the relative angle increases, and then the device port 403 opens and finally the radiator port 401 opens. On the other hand, when the relative angle is within the negative range, the heater port 402 does not open, and the device port 403 first opens as the relative angle increases and then the radiator port 401 opens. When the outside air temperature is equal to or lower than the reference temperature and the heater of the air conditioner is likely to be used, it is necessary to circulate coolant to the heater core 11 and warm up heating air with heat generated in the internal combustion engine 1. Accordingly, the ECU 500 controls the motor 408 in the winter mode. On the other hand when the outside an temperature is higher than the reference temperature, it is not necessary to use the heater of the air conditioner and therefore not necessary to circulate coolant to the heater port 402. Accordingly, the ECU 500 controls the motor 408 in the summer mode.

During cold operation of the internal combustion engine 1, to promote warming-up of the internal combustion engine 1, the ECU 500 controls the motor 408 within such a range that the radiator port 405 does not open. Specifically, in the winter mode, the ECU 500 controls the relative angle within the region of σ2 indicated by the arrow in FIG. 7. while in the summer mode, the ECU 500 controls the relative angle within the region of σ1 indicated by the arrow in FIG. 7. Whether or not the internal combustion engine 1 is in cold operation can be determined on the basis of the temperature of coolant detected by the head coolant temperature sensor 14, the outlet coolant temperature sensor 15, etc.

During warming-up operation, it is possible to control the rate of coolant circulated through the second coolant passage P2 by controlling the opening degree of the device port 403. If the rate of the coolant circulated through the second coolant passage P2 is too high, the heat of the coolant is taken away by the throttle body 6, the EGR valve 7, the EGR cooler 8, the oil cooler 9, and the automatic transmission fluid warming-up unit 10, so that warming-up is slow to complete. On the other hand, if the rate of the coolant circulated through the second coolant passage P2 is too low, warming-up is slow to complete, as the engine parts cannot be effectively warmed by means of the throttle body 6, the EGR valve 7, the EGR cooler 8, the oil cooler 9, and the automatic transmission fluid warming-up unit 10.

Therefore, during such warming-up operation, the motor control unit 502 calculates the amount of rise in temperature of the coolant while passing through the cylinder head 2 using the head coolant temperature sensor 14 and the outlet coolant temperature sensor 15, and controls the opening degree of the device port 403 such that the amount of rise remains within a target range.

Then, after the temperature of the coolant detected by the head coolant temperature sensor 14 and the outlet coolant temperature sensor 15 has become sufficiently high and warming-up has completed, to avoid overheating of the internal combustion engine 1, the motor 408 is controlled within such a range that the radiator port 401 opens. Specifically, in the winter mode, the ECU 500 controls the relative angle within the region of φ2 indicated by the arrow in FIG. 7, while in the summer mode, the ECU 500 controls the relative angle with in the region of φ1 indicated by the arrow in FIG. 7.

In the multiway valve 4, it is possible to control the rate of coolant circulated to the radiator 12 through the first coolant passage P1 by controlling the opening degree of the radiator port 401. If the rate of coolant circulated to the radiator 12 is too low, heat is not sufficiently dissipated in the radiator 12. On the other hand, if the rate of coolant circulated to the radiator 12 is too high, heat is discarded unnecessarily through the radiator 12, which deteriorates the operation efficiency of the internal combustion engine 1.

Therefore, upon completion of warming-up, the ECU 500 controls the opening degree of the radiator port 401 such that the temperature of the coolant detected by the head coolant temperature sensor 14 and the outlet coolant temperature sensor 15 remains within a certain range and that the amount of rise in temperature of the coolant passing through the cylinder head 2 remains within a target range.

After thus having selected and executed the normal control, the ECU 500 temporarily ends the current process. On the other hand, as shown in FIG. 9, when it is determined in step S102 that the position sensor 407 is malfunction (S102: YES), i.e., if malfunction in the position sensor 407 is detected but no malfunction in the motor 408 is detected, the ECU 500 proceeds with the process to step S105.

In this case, since there is malfunction in the position sensor 407 and the opening degree of the valve body 404 cannot be sensed, in step S105, the ECU 500 performs first control that is one mode of fail-safe control.

In the first control of step S105, the ECU 500 drives the motor 408 to the end of the motion range and fixes the opening degree of the valve body 404 at the stopper opening degree. In this case, since there is malfunction in the position sensor 407, the ECU 500 cannot detect the angle of the valve body 404 relative to the housing 400, but there is no malfunction in the motor 408. Therefore, if the motor 408 is continuously driven until the stopper 400 of the valve body 404 and the stopper 413 of the housing 400 come into contact with each other, the opening degree of the valve body 404 can be fixed at the stopper opening degree. In the first control, too, as in the normal control the ECU 500 switches between the summer mode and the winter mode according to the outside air temperature detected by the outside air temperature sensor 124. Accordingly, in the winter mode, the opening degree of the valve body 404 is fixed at the winter-mode stopper opening degree, while in the summer mode, the opening degree of the valve body 404 is fixed at the summer-mode stopper opening degree.

In the first control of step S105, the ECU 500 fixes the opening degree of the valve body 404 at the stopper opening degree, and then, as at normal times, controls the engine rotation speed in the same manner as in the normal control of step S104.

Having thus selected and executed the first control, the ECU 500 temporarily ends the current process. When it is determined in step S101 that the motor 408 is malfunction (S101: YES), the ECU 500 proceeds with the process to step S103.

In step S103, the ECU 500 determines whether or not the position sensor 407 is malfunction by the same method as in step S102. That is, the ECU 500 determines that the position sensor 407 is malfunction if the sensor malfunction flag set through the process shown in FIG. 11 is on, and determines that the position sensor 407 is not malfunction if the sensor malfunction flag is off.

When it is determined in step S103 that the position sensor 407 is malfunction (S103: YES), the ECU 500 proceeds with the process to S106.

In this case, both malfunction in the position sensor 407 and malfunction in the motor 408 are detected. When both the motor 408 and the position sensor 407 are malfunction, the angle of the valve body 404 relative to the housing 400 cannot be detected as well as the relative angle cannot be varied by moving the valve body 404. Therefore, in step S106, the ECU 500 performs second control that is another mode of fail-safe control.

In the second control of step S106, the ECU 500 stops controlling the motor 408. Meanwhile, the ECU 500 sets an upper-limit rotation speed for the engine rotation speed and controls the engine rotation speed so as not to exceed the upper-limit rotation speed. That is, in the second control, the control range of the engine rotation speed is limited to a range not exceeding the upper-limit rotation speed, and if the engine rotation speed at which a required torque can be first obtained is above the upper-limit rotation speed, the engine rotation speed is controlled to the upper-limit rotation speed.

If malfunction occurs in the position sensor 407 or the motor 408 while the opening degree of the valve body 404 of the multiway valve 4 is small and the multiway valve 4 becomes uncontrollable, the amount of coolant that can pass through the multiway valve 4 is unnecessarily limited. As a result, when the engine rotation speed becomes high and the amount of coolant discharged from the coolant pump 13 becomes large, the pressure inside the circulation route may become excessively high.

In this case, there is malfunction in the position sensor 407 and the opening degree of the valve body 404 cannot be sensed. Therefore, the upper-limit rotation speed is set on the assumption of the state where all the ports 401, 402, 403 are closed, i.e., the state where the opening degree of the valve body 404 is the minimum opening degree. Specifically, such a range of engine rotation speed that the pressure inside the circulation route remains at or below a predetermined value even when the opening degree of the valve body 404 is the minimum opening degree is specified by experiment, and a value within that range is set as the upper-limit rotation speed. Since the relief valve 5 is provided on the circulation route of cooing water as described with reference to FIG. 2, even in the state where all the ports 401, 402, 403 are closed, part of coolant is relieved to the first coolant passage P1 through the relief valve 5. The upper-limit rotation speed is set to a value within such a range that the pressure inside the circulation route remains at or below the predetermined value in the state where the coolant is thus relieved by the relief valve 5. The predetermined value is equivalent to a pressure lower than a pressure at which a hose constituting a part of the circulation route comes off under the pressure of coolant.

Having thus selected and executed the second control, the ECU 500 temporarily ends the current process. When it is determined in step S103 that the position sensor 407 is not malfunction (S103: NO), the ECU 500 proceeds with the process to step S107.

In this case, there is no malfunction in the position sensor 407 and the opening degree of the valve body 404 can be sensed, but there is malfunction in the motor 408 and the motor 408 cannot be controlled. Therefore, in step S107, the ECU 500 performs third control that is another mode of fail-safe control.

In the third control of step S107, the ECU 500 stops controlling the motor 408. On the other hand, since there is no malfunction in the position sensor 407, the opening degree of the valve body 404 can be sensed. Therefore, the ECU 500 sets the upper-limit rotation speed for the engine rotation speed according to the sensed opening degree of the valve body 404 and controls the engine rotation speed so as not to exceed the upper-limit rotation speed. That is, in the third control, too, as in the second control, the control range of the engine rotation speed is limited to a range not exceeding the upper-limit rotation speed. However, the third control is different from the second control in that the upper-limit rotation speed is set according to the opening degree of the valve body 404.

In the third control, the ECU 500 sets the upper-limit rotation speed according to the relative angle detected by the position sensor 40 with reference to a map in which relations between the relative angle detected by the position sensor 407 and the upper-limit rotation speed corresponding to that relative angle are stored.

Figure 12:
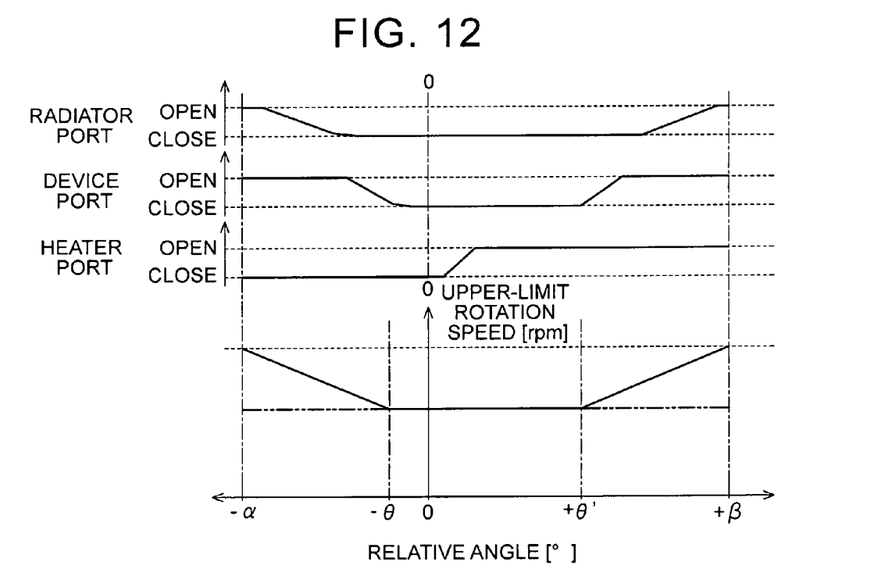
FIG. 12 is a graph showing relations between the angle of the valve body relative to the housing of the multiway valve and an upper-limit rotation speed in the event of a motor malfunction.

FIG. 12 is a graph showing relations between the relative angle detected by the position sensor 407 and the upper-limit rotation speed in the third control. As indicated by the solid line, it can be seen that the upper-limit rotation speed increases gradually as the relative angle increases and the opening degree of the valve body 404 increases in the ranges of relative angle from the relative angle at which the device port 403 starts to open (−θ to −α, +θ' to +β).

The larger the opening degree of the valve body 404 is, the more easily coolant passes through the multiway 4, and the pressure inside the circulation route is less likely to exceed the predetermined value even when the engine rotation speed becomes high. The map referred to in the third control is created by specifying, by experiment, such a range of engine rotation speed that the pressure inside the circulation route remains at or below the predetermined value according to the opening degree of the valve body 404 and setting a value within that range as the upper-limit rotation speed.

In FIG. 12, the upper-limit rotation speed in the second control is indicated by the two-dot dashed line for comparison. It can be seen that, compared with the second control in which the upper-limit rotation speed is uniformly set on the assumption of the opening degree of the valve body 404 being the minimum opening degree, in the third control, the upper-limit rotation speed can be made higher when the opening degree of the valve body 404 is larger.

Having thus selected and executed the third control, the ECU 500 temporarily ends the current process. Next, effects produced by the execution of the sequence of process steps shown in FIG. 9 will be described.

When there is malfunction in the motor 408 or the position sensor 407 of the multiway valve 4, the first control, the second control, and the third control are executed as fail-safe control.

The second control is executed if there is malfunction in both the motor 408 and the position sensor 407. In the second control, the upper-limit rotation speed is provided such that the pressure inside the circulation route remains at or below the predetermined value even when all the ports 401, 402, 403 are closed, and the engine rotation speed is limited accordingly.

On the other hand, the first control is executed if the motor 408 is not malfunction but the position sensor 407 is malfunction. In this first control, the motor 408 is driven to the end of the motion range and the opening degree of the valve body 404 is fixed at the stopper opening degree, and the engine rotation speed is controlled without the upper-limit rotation speed provided. That is, in the first control, the engine rotation speed is not limited, and the limits on the engine rotation speed are relaxed compared with the second control.

The third control is executed if the position sensor 407 is not malfunction but the motor 408 is malfunction. In the third control, the upper-limit rotation speed is set according to the opening degree of the valve body 404 at that time, and the upper-limit rotation speed is made higher as the opening degree is larger. That is, in the third control, too, the limits on the engine rotation speed are relaxed compared with the second control.

Thus, according to the embodiment having been described above, the following advantages can be obtained.
(1) When the opening degree of the valve body 404 can be neither sensed nor controlled, the second control is executed and the amount of coolant discharged is reduced. Thus, even if the opening degree of the valve body 404 is the minimum opening degree and the pressure inside the circulation route is likely to become high, the pressure inside the circulation route remains at or below the predetermined value.

(2) If the opening degree of the valve body 404 cannot be sensed but the multiway valve 4 can be driven, the first control is executed and the opening degree of the valve body 404 is fixed at the stopper opening degree. In this case, therefore, the limits on the engine rotation speed can be relaxed compared with when there is malfunction in both the position sensor 407 and the motor 408. That is, in this case, it is possible to make the control range of the engine rotation speed wider than when there is malfunction in both the position sensor 407 and the motor 408 while preventing the pressure inside the circulation route from becoming excessively high.

(3) The third control is executed if there is no malfunction in the position sensor 407 but there is malfunction in the motor 408. Accordingly, if the opening degree of the valve body 404 is larger than the minimum opening degree, the limits on the engine rotation speed can be relaxed compared with when there is malfunction in both the position sensor 407 and the motor 408.

To sum up the advantages (1) to (3), compared with when the configuration is adopted in which limits are uniformly imposed on the engine rotation speed on the assumption that the opening degree of the valve body 404 is the minimum opening degree in the event of malfunction in the multiway valve 4, it is possible to prevent the performance of the internal combustion engine 1 from being unnecessarily limited while preventing the pressure inside the circulation route from becoming excessively high.

The above embodiment can also be implemented in appropriately modified embodiments as follows. Of the modified examples, those that can be implemented in combination may be implemented in an appropriate combination.

Malfunctions occurring in the multiway valve 4 are not limited to disconnection and short-circuit of the motor 408 and the position sensor 407. Malfunctions that cannot be identified to be malfunction of the motor 408 or malfunction of the position sensor 40 can also occur in the multiway valve 4.

For example, it is conceivable that the valve body 404 cannot be driven due to sticking of the multiway valve 4 or that the multiway valve 4 cannot be properly controlled due to a delay in response of the multiway valve 4. Moreover, when the stopper 413 or the shaft 405 of the valve body 404 breaks, the motor 408 fails to stop at the stopper position when the motor 408 is rotated. As a result, even if there is no malfunction in the motor 408 and the position sensor 407, it is no longer possible to properly control the opening degree of the valve body 404. In the event of such a stopper malfunction too, the multiway valve 4 cannot be property controlled.

Therefore, fail-safe control may be executed in the event of such malfunction as well. For example, the ECU 500 may execute the sequence of process steps shown in FIG. 13 in addition to the sequence of process steps described with reference to FIG. 9.

Figure 13:
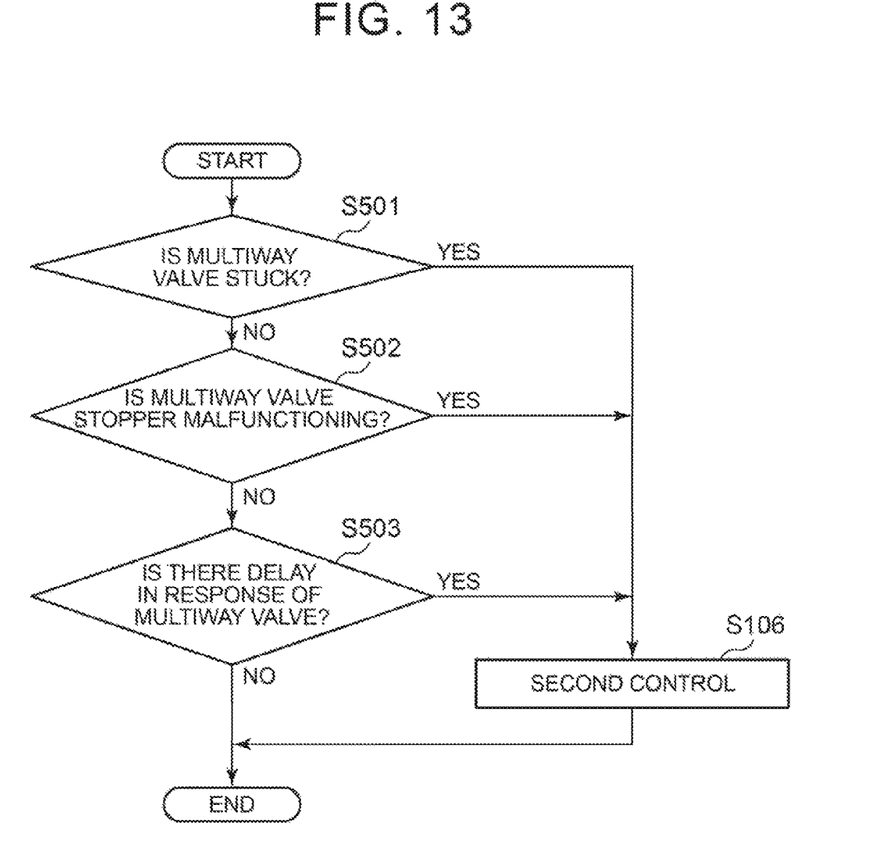
FIG. 13 is a flowchart showing the flow of a process executed by an ECU according to another embodiment to limit the rotation speed.

As shown in FIG. 13, when this sequence of process steps is started, the ECU 500 first determines in step S501 whether or not the multiway valve 4 is stuck. Whether the multiway valve 4 is stuck can be determined on the basis of a phenomenon that the output of the position sensor 407 does not vary despite the motor 408 being driven.

When it is determined in step S501 that the multiway valve 4 is not stuck (S501: NO), the ECU determines whether or not there is a stopper malfunction in the multiway valve 4 in step S502. When a stopper malfunction that causes the valve body 404 to fail to stop at the stopper position occurs, the relative angle detected by the position sensor 407 becomes $-\alpha°$ or smaller or $+\beta°$ or larger. At other times the relative angle may vary stepwise between the minus side and the plus side despite the motor 408 being rotated in one direction. When such a phenomenon occurs, the ECU 500 determines that there is a stopper malfunction.

When it is determined in step S502 that there is no stopper malfunction in the multiway valve 4 (S502: NO), the ECU 500 determines whether or not there is a delay in response of the multiway valve 4. Here, it is determined that there is a delay in response of the multiway valve 4 when the time from the start of driving of the motor 408 until the relative angle detected by the position sensor 407 starts to vary is equal to or longer than a predetermined time When it is determined in step S505 that there is no delay in response of the multiway valve 4 (S503: NO), the ECU 500 temporarily ends the current process. On the other hand, if the determination result is affirmative in any one of steps S501, S502, S503 (S501, S502, S503: YES), the ECU 500 executes the second control in step S106. When it is determined that the second control is to be executed through the sequence of process steps shown in FIG. 13, the second control is executed in priority to the control that is selected through the sequence of process steps shown in FIG. 9. That is, even when neither disconnection nor short-circuit of the motor 408 and the position sensor 407 is detected and the normal control is selected through the sequence of process steps shown in FIG. 9, the second control is executed when it is determined through the sequence of process steps shown in FIG. 13 that the second control is to be executed.

Thus, it is possible to prevent the pressure inside the circulation route from becoming excessively high even when the opening degree of the valve body 404 is the minimum opening degree by executing the second control if there is malfunction, such as sticking, a stopper malfunction, or a delay in response of the multiway valve 4, that cannot be identified to be malfunction of the position sensor 407 or malfunction of the motor 408.

Thus, in addition to the advantages (1) to (3) described above, another advantage is obtained in that it is also possible to prevent the pressure inside the circulation route from becoming excessively high when there is malfunction, such as sticking, a stopper malfunction, or a delay in response of the multiway valve 4, that cannot be identified to be malfunction of the position sensor 407 or malfunction of the motor 408.

In the example shown above, the third control is executed if the motor 408 is malfunction but the position sensor 407 is not malfunction. Alternatively, the second control may be executed if the motor 408 is malfunction regardless of whether or not the position sensor 407 is malfunction.

In this case, too, compared with when the configuration is adopted in which the second control is executed, and the engine rotation speed is uniformly limited in the event of malfunction in the multiway valve 4, it is possible to relax the limits on the engine rotation speed by executing the first control if the position sensor 407 is malfunction but the motor 408 is not malfunction. That is, it is possible to prevent the performance of the internal combustion engine 1 from being significantly limited while preventing the pressure inside the circulation route from becoming excessively high.

While the position sensor 407 that detects the angle of the valve body 404 relative to the housing 400 has been illustrated as the opening degree detection unit, the opening degree detection unit can be appropriately changed as long as the opening degree of the valve body 404 can be detected. For example, it is possible to sense the opening degree of the valve body 404 by detecting the rotation angle of the motor 408. Therefore, a rotary encoder etc. that detects the rotation angle of the motor 408 may be provided as the opening degree detection unit.

While the multiway valve 4 including the three ports, the radiator port 401, the heater port 402, and the device port 403, has been illustrated as the control valve, a similar problem can occur whether or not the number of the ports is three. Therefore, the same configuration can also be adopted in a control device used for an internal combustion engine having a control valve of which the number of the ports is other than three.

While the multiway valve 4 that has the winter mode and the summer mode and selectively uses either mode has been illustrated as the control valve, it is not absolutely necessary that the control valve has the winter mode and the summer mode. While the multiway valve 4 of which all the ports 401, 402, 403 are closed at the minimum opening degree has been illustrated as the control valve, a similar problem can occur in a control valve of which one of the ports is open even when the valve is set to the minimum opening degree. Therefore, the same configuration can also be applied to a control device used for an internal combustion engine that has a control valve of which one of the ports is open even when the valve is set to the minimum opening degree.

It is not absolutely necessary that the stopper opening degree is the opening degree at which the opening degree of the valve body is maximum. That is, the same configuration can also be applied to a control device used for an internal combustion engine that has a control valve of which the position of the maximum opening degree is located in the middle of the motion range of the valve body. Even when the position of the maximum opening degree is located in the middle of the motion range of the valve body, it is possible to relax the limits on the engine rotation speed when the first control is executed compared with when the second control is executed as long as the stopper opening degree is an opening degree larger than the minimum opening degree.

However, if the stopper opening degree is not the maximum opening degree, even when the first control is executed and the opening degree of the valve body is fixed at the stopper opening degree, the opening degree may be insufficient and the pressure inside the circulation route may exceed the predetermined value when the engine rotation speed becomes high. Therefore, if the stopper opening degree is not the maximum opening degree, when malfunction in the opening degree detection unit is detected but no malfunction in the motor 408 is detected, the valve body may be moved to the end of the motion range to fix the opening degree at the stopper opening degree larger than the minimum opening degree and impose limits on the engine rotation speed. In this case, it is possible to prevent the pressure inside the circulation route from becoming excessively high by setting the upper-limit rotation speed so as to limit the engine rotation speed to such a speed range that the pressure inside the circulation route remains at or below the predetermined value at the stopper opening degree.

Nevertheless, in terms of preventing the pressure inside the circulation route from becoming excessively high without limiting the engine rotation speed as far as possible, it is desirable that the stopper opening degree is set to be the maximum value of the opening degree of the valve body as in the above embodiment.

If the stopper opening degree is set to be the maximum value of the opening degree of the valve body, the opening degree of the valve body is fixed at the maximum value when malfunction in the opening degree detection unit is detected but no malfunction in the motor 408 is detected. Thus, the control valve assumes a state in which coolant can most easily pass therethrough, and the limits on the engine rotation speed can be minimized.

What is claimed is:

1. A control device for an internal combustion engine, the internal combustion engine including an output shaft and a cooling system, the cooling system including:
   a circulation route through which coolant circulates; a pump; and a control valve,
   the pump and the control valve being disposed on the circulation route,
   the pump being configured to be driven by the output shaft,
   the control valve including a housing, a valve body housed in the housing, and an opening degree detector, the valve body being configured, to be rotated by a motor to adjust the opening degree, the opening degree detector being configured to detect the opening degree of the valve body,
   the control device comprising
   an electronic control unit configured to control the motor, control a rotation speed of the output shaft, detect malfunction, in the motor, and detect malfunction in the opening degree detector;
   the electronic control unit being configured to, when both malfunction in the opening degree detector and malfunction in the motor are detected by the electronic control unit, limit the rotation speed of the output shaft to a speed range in which a pressure inside the circulation route remains equal to or lower than a predetermined value and the opening degree of the valve body is a minimum opening degree, and the electronic control unit being configured to, when the malfunction in the opening degree detector is detected and no malfunction in the motor is detected by the electronic control unit, relax the limits on the rotation speed of the output shaft, compared with the limits when both the malfunction in the opening degree detector and the malfunction in the motor are detected by the electronic control unit, and drive the motor to an end of a motion range of the motor and fix the opening degree of the valve body at a stopper opening degree, the stopper opening degree being larger than the minimum opening degree.

2. The control device according to claim 1, wherein the electronic control unit is configured to, when the malfunction in the motor is detected but no malfunction in the opening degree detector is detected by the electronic control unit, limit the rotation speed of the output shaft to the speed range in which the pressure inside the circulation route remains equal to or lower than the predetermined value when the opening degree of the valve body is an opening degree detected by the opening degree detector.

3. The control device according to claim 1, wherein the stopper opening degree is set to be a maximum value of the opening degree of the valve body.

4. A control method for an internal combustion engine, the internal combustion engine including an output shaft and a cooling system, the cooling system including a circulation route through which coolant circulates, a pump, and a control valve, the pump and the control valve being disposed on the circulation route, the pump being configured to be driven by the output shaft, the control valve including a housing, a valve body housed in the housing, and an opening degree detector, the valve body being configured to be rotated by a motor to adjust the opening degree, the opening degree detector being configured to detect the opening degree of the valve body, the control method comprising:

when both malfunction in the opening degree detector and malfunction in the motor are detected, limiting a rotation speed of the output shaft to a speed range is which a pressure inside the circulation route remains equal to or lower than a predetermined value and the opening degree of the valve body is a minimum opening degree; and when malfunction in the opening degree detector is detected and no malfunction in the motor is detected, relaxing the limits on the rotation speed of the output shaft, compared with the limits when both the malfunction in the opening degree detector and the malfunction in the motor are detected, and driving the motor to an end of a motion range of the motor and fixing the opening degree of the valve body at a stopper opening degree, the stopper opening degree being larger than the minimum opening degree.

* * * * *